(12) United States Patent
Deng et al.

(10) Patent No.: US 10,828,735 B2
(45) Date of Patent: Nov. 10, 2020

(54) RIVETING AND GRINDING ASSEMBLY FOR THE NOZZLE OF A SCREW SHAFT VALVE

(71) Applicant: DONGGUAN UNIVERSITY OF TECHNOLOGY, Dongguan (CN)

(72) Inventors: Jun Deng, Dongguan (CN); Chuliang He, Dongguan (CN)

(73) Assignee: DONGGUAN UNIVERSITY OF TECHNOLOGY, Dongguan (CN)

(*) Notice: Subject to any disclaimer, the term of this patent is extended or adjusted under 35 U.S.C. 154(b) by 98 days.

(21) Appl. No.: 16/289,725

(22) Filed: Mar. 1, 2019

(65) Prior Publication Data

US 2020/0038940 A1 Feb. 6, 2020

(51) Int. Cl.
| | |
|---|---|
| *B23P 21/00* | (2006.01) |
| *B23P 15/00* | (2006.01) |
| *B23Q 39/04* | (2006.01) |
| *B21J 15/14* | (2006.01) |
| *B24B 19/00* | (2006.01) |
| *F16K 27/00* | (2006.01) |

(52) U.S. Cl.
CPC .............. *B23P 21/006* (2013.01); *B21J 15/14* (2013.01); *B23P 15/001* (2013.01); *B23Q 39/044* (2013.01); *B23Q 39/046* (2013.01); *B24B 19/00* (2013.01); *F16K 27/00* (2013.01); *Y10T 29/513* (2015.01); *Y10T 29/5128* (2015.01); *Y10T 29/5373* (2015.01); *Y10T 29/5377* (2015.01); *Y10T 29/53778* (2015.01)

(58) Field of Classification Search
CPC .... B23Q 39/04; B23Q 39/042; B23Q 39/044; B23Q 39/046; B23P 15/001;
(Continued)

(56) References Cited

U.S. PATENT DOCUMENTS

| | | | | |
|---|---|---|---|---|
| 2,913,816 A | * | 11/1959 | Gray | B21D 51/38 |
| | | | | 29/38 R |
| 2,981,282 A | * | 4/1961 | Mack | F16K 15/00 |
| | | | | 137/516.29 |

(Continued)

FOREIGN PATENT DOCUMENTS

| | | | |
|---|---|---|---|
| CN | 105881019 A | * | 8/2016 |
| CN | 106736499 A | * | 5/2017 |

*Primary Examiner* — Erica E Cadugan
*Assistant Examiner* — Michael Vitale
(74) *Attorney, Agent, or Firm* — Law Offices of Steven W. Weinrieb

(57) ABSTRACT

The present invention generally relates to assembly equipment of valve body, especially to riveting and grinding assembly for nozzle of screw shaft valve. The invention may include a rack, a power control box, a turntable and a turntable divider. A carrier assembly which engages with the screw shaft valve body is installed on the edge of the turntable with uniform distribution. On the center part of the turntable, a support shaft which is installed on and fixed with the rack is vertically interposed and on the top of the support shaft, an upper supporting disc is installed. A valve pipe feeding device, a valve pipe preloading device, a valve pipe riveting device and a valve pipe grinding device which engage with the carrier assembly are installed on the said rack on the rotational direction of turntable. As the threaded pipe is put into the carrier assembly by valve pipe feeding device, the carrier assembly rotates counterclockwise along the turntable and rotates to the valve pipe feeding device to the press threaded pipe into the valve seat. Thereafter the carrier assembly rotates the valve pipe riveting device and rivets threaded pipe with a valve flange in order to finish assembling process. Finally, the carrier assembly rotates the valve pipe grinding device to grind nozzle of valve to finish grinding and riveting process of threaded pipe with high positioning accuracy of assembly and marvelous hermetic sealing.

9 Claims, 12 Drawing Sheets

(58) Field of Classification Search
CPC .............. B23P 21/006; Y10T 29/5127; Y10T 29/5128; Y10T 29/5129; Y10T 29/513; Y10T 29/53496; Y10T 29/5377; Y10T 29/53774; Y10T 29/53778; Y10T 29/5373
USPC ............ 29/38 A, 38 B, 38 C, 38 R, 243.521, 29/243.53, 243.54, 243.55, 812.5
See application file for complete search history.

(56) References Cited

U.S. PATENT DOCUMENTS

| | | | | |
|---|---|---|---|---|
| 3,336,823 A * | 8/1967 | Bonzi | ................... | B23Q 16/04 |
| | | | | 408/71 |
| 3,341,927 A * | 9/1967 | Grainger | ................. | H01G 9/20 |
| | | | | 29/38 R |
| 4,523,360 A * | 6/1985 | Giovanola | ......... | B23Q 11/0042 |
| | | | | 29/38 C |
| 5,009,391 A * | 4/1991 | Steigerwald | ...... | A61M 39/0613 |
| | | | | 137/849 |
| 5,277,049 A * | 1/1994 | Endo | ...................... | B21J 15/025 |
| | | | | 29/243.53 |
| 6,609,042 B1 * | 8/2003 | Kumeth | .................. | B23P 19/04 |
| | | | | 29/38 A |
| 7,513,033 B2 * | 4/2009 | Pfeiffer | ................ | B23P 21/006 |
| | | | | 29/281.4 |
| 2003/0182795 A1 * | 10/2003 | Budig | ..................... | B23Q 1/52 |
| | | | | 29/792 |
| 2009/0211096 A1 * | 8/2009 | Seitter | ............... | F02M 51/0614 |
| | | | | 29/890.127 |
| 2011/0236146 A1 * | 9/2011 | De Koning | .......... | B23Q 7/1431 |
| | | | | 409/131 |
| 2017/0009901 A1 * | 1/2017 | Ritter | ................... | F16K 25/005 |

* cited by examiner

RIVETING AND GRINDING ASSEMBLY FOR THE NOZZLE OF A SCREW SHAFT VALVE

FIELD OF THE INVENTION

The present invention relates generally to assembly equipment for valve bodies, and more especially to a riveting and grinding assembly for the nozzle of a screw shaft valve.

BACKGROUND OF THE INVENTION

Screw shaft valve 17, as shown in FIG. 13, may include a valve seat 22 whose lower part is connected to a lower valve tube 24. To the side of the valve seat 22, a r-type side valve pipe is connected. And on its upper end, a valve flange 20 which rivets the threaded pipe 21 on the upper end is connected 20. To the side of the valve flange 20, a side positioning plate 23 is installed. Existing technology requires an operator to assemble Tee shaped screw shaft valve by hand which is not efficient and accurate enough and the hermetic sealing is not satisfactory. Acceptance rate and production efficiency are influenced. In addition, as threaded pipe directly rivets valve flange, burrs from nozzle of screw shaft valve will exist, which will further influence the hermetic sealing of the product.

SUMMARY OF THE INVENTION

The present invention relates to a riveting and grinding assembly for the nozzle of a screw shaft valve. First, put threaded pipe into a carrier assembly by a loading device. Then the carrier assembly rotates counterclockwise and rotates to a prevalve pipe feeding device to press the threaded pipe into a valve seat. Next a valve pipe riveting device rivets the threaded pipe with a valve flange in order to finish assembling process. Then the carrier assembly rotates to a valve pipe grinding device to grind nozzle of valve to finish grinding and riveting process of threaded pipe with high positioning accuracy of assembly and marvelous hermetic sealing.

To accomplish the above goal, the present technical schemes of invention relates to a riveting and grinding assembly for nozzle of screw shaft valve, which may include a rack 1, a power control box, a turntable 2 and a turntable divider which engage with each other and are installed on the rack 1. On the edge of the said turntable 2, several carrier assemblies 3 which engage with the screw shaft valve body 17 are distributed in even span. On the center part of the said turntable 2, a support shaft 9 which is fixed with the rack 1 is vertically interposed and on top of the support shaft 9, an upper supporting disc 10 is installed. On the said rack 1, a valve pipe feeding device 4, a valve pipe preloading device 6, a valve pipe riveting device 7 and a valve pipe grinding device 8 which engage with the carrier assembly 3 are installed in the rotational direction of the turntable 2. The said turntable divider, valve pipe feeding device 4, valve pipe preloading device 6, valve pipe riveting device 7 and valve pipe grinding device 8 are all electrically connected to the power control box.

Preferably, the said valve pipe grinding device 8 may include a grinding rack 54 which is installed on the rack 1 and a carrier support 25 which is installed under the turntable 2 and engages with the carrier assembly 3. On horizontal direction of the grinding rack 54, a transverse grinding knife raising plate 57 which engages with the upper supporting disc 10 is installed. On the upper end of the said grinding rack 54, a push-in grinding cylinder 55 and a grinding knife adjusting cylinder 56 are installed with top-side down in vertical direction. The output side of the said grinding knife adjusting cylinder 56 goes through the transverse grinding knife raising plate 57 and is connected to a grinding knife raising plate 58. On the said grinding knife raising plate 58, a grinding knife 62 which engages with the threaded pipe 21 by means of plug and fit is installed vertically. The output end of the said push-in grinding cylinder 55 is connected to a grinding spindle 61 which engages with the upper end of the grinding knife 62. Both the said push-in grinding cylinder 55 and grinding knife adjusting cylinder 56 are electrically connected to the power control box.

Preferably, a stopper cylinder 59 is installed on the bottom of the said transverse grinding knife raising plate 57. At the output end of the said stopper cylinder 59 a holding plate 60 which engages the screw shaft valve body 17 is connected. On one end of the said holding plate 60 is set an open slot designed for the threaded pipe 21. The said stopper cylinder 59 is electrically connected to the power control box.

Preferably, the said carrier assembly 3 may include a carrier seat 12 which is installed on the turntable 2 by fixing bolts 11. On center part of the said carrier seat 12 is set a countersunk hole where a hollow carrier positioning axis 14 is installed by plugging and fitting. On the said carrier positioning axis 14, a carrier cover plate 13 which engages with the carrier seat 12 is fixed. Between the said carrier positioning axe 14 and the said carrier seat 12, a carrier damping spring 18 is installed. On upper end of the said positioning axis 14, a loading seat 15 which engages with the valve seat 22 by plug and fit is sleeved. On both sides of the said loading seat 15, positioning slots 16 which respectively engage with the side positioning plate 23 and the side valve pipe 19 are installed.

Preferably, the said valve pipe feeding device 4 may include a loading rack 26 installed on the rack 1, a vibration feeding pan 5, and a carrier support 25 which engages with the carrier assembly 3 and is installed under the turntable 2. On the said feeding rack 26, a transverse feeding plate 34 which is connected to the upper supporting disc 10 is horizontally installed. On the said transverse feeding plate 34, a threaded pipe distribution device which engages with the vibration feeding pan 5 is installed. On upper end of the said feeding rack 26, a feeding cylinder 29 is installed vertically downward. On the output end of the said feeding cylinder 29 is connected a push-in lever 27 which shares the same axis with the carrier positioning axe 14. The lower end of the said push-in lever 27 goes through a push-in guide plate 28 which is installed on the transverse feeding plate 34, and the push-in lever 27 engages with threaded pipe distribution device by means of plug and fit. The said feeding cylinder 29 and the vibration feeding pan 5 are electrically connected to the power control box.

Preferably, the said threaded pipe distribution device may include a dispensing base 32 which is installed on the transverse feeding plate 34 on horizontal direction. On one end of the said dispensing base 32 is embedded a guiding sliding sleeve 36 which shares the same axis with the push-in lever 27. In the said guiding sliding sleeve 36 is slidably set a push-in joining pipe 37 engaging with the push-in lever 27 by means of plug and fit. On the lower end of the said push-in joining pipe 37, a guiding connecting plate 38 is sleeved. The said guiding connecting plate 38 is connected to the output of joining guide cylinder 33 which is installed on the transverse feeding plate 34 vertically. On the other end of the said distribution seat 32, a pushing cylinder 31 is installed on the horizontal direction. On the output end of the said pushing cylinder 31 is connected a distribution displacement block 35 which slidably engages with the distribution seat 32. On top of the said distribution displacement block 35, a dispensing seat 39 is installed and on the upper end of the said dispensing seat 39 is sleeved a guide tube 30 which engages with the vibration feeding pan 5 by means of plug and fit. The lower end of the said guide tube 30 may communicate with a dispensing hole in the distribution displacement block 35, and lower end of the same dispensing hole may communicate with the push-in joining pipe 37. The said pushing cylinder 31 and joining guide cylinder 33 are electrically connected to the power control box.

Preferably, said valve pipe preloading device 6 may include a push-in rack which is installed on the rack 1 and a carrier support 25 which is installed under the turntable 2 and engages with the carrier assembly 3. On the said push-in rack 40, a transverse push-in plate 45 which is connected to the upper supporting disc 10 is installed on horizontal direction. On the transverse push-in plate 45, directly above the carrier assembly a push-in guide bearing 44 is installed by plug and fit. On top of the push-in support 40, a valve pipe push-in cylinder 41 is vertically installed downwards. The output end of the said valve pipe push-in cylinder 41 is connected with a push-in shaft 42, which engages with the push-in guiding bearing 44 by plug and fit, furthermore, the push-in shaft and the thread valve pipe on the carrier assembly 3 shares the same axe. A push-in buffer spring 43 is sleeved to the push-in shaft 42. The said valve pipe push-in cylinder 41 is electrically connected to the power control box.

Preferably, said valve pipe riveting device 7 may include a riveting rack 46 which is installed on the rack 1 and a carrier support 25 which is installed under the turntable 2 and engages with the carrier assembly 3. On the said riveting rack 46, a transverse riveting plate 48 which is connected to the upper supporting disc 10 is installed horizontally. Immediately above the carrier assembly 3 on the said transverse riveting plate 48 is set a riveting guide bearing 47 by means of plug and fit. On top of the said riveting rack 46, a riveting cylinder 51 whose output is connected to a riveting spindle 50 is installed vertically downward. On the lower end of the said riveting spindle 50 is set a hole which engages with the threaded pipe 21 by means of plug and fit and inside the hole, there is a guide plug 53 engaging with the threaded pipe 21 by sliding. An inner riveting damper spring 52 is installed at the connection between the upper end of the said guide plug 53 and the riveting spindle 50 while an outer riveting damper spring 49 engaging with the upper end of the riveting guiding bearing 47 is set on the riveting spindle 50. The said riveting cylinder 51 is electrically connected to the power control box.

Preferably, on the front left of the said turntable 2, an unloading device is installed, which may include an unloading rack 63 which is installed on the rack 1. And on top of the said unloading rack 63, a transverse unloading plate 64 is installed vertically. On the said transverse unloading plate 64, an unloading translational sliding bar 65 is installed vertically. A pneumatic sliding block 66 is slidably fixed on the said unloading translational sliding bar 65. On the said pneumatic sliding block 66, a reclaiming and discharging cylinder 67 is vertically fixed. The output of the said reclaiming and discharging cylinder 67 is connected to a clamping cylinder 68 whose lower end is connected a clamping claw 69 which engages with the screw shaft valve body 17. A clamping opening 70 engaging with the threaded pipe 21 is installed on the said clamping claw 69.

DETAILED DESCRIPTION OF THE ILLUSTRATED EMBODIMENT

Component parts in the FIGURES are:
1. rack,
2. turntable,
3. carrier assembly,
4. valve pipe feeding device,
5. vibration feeding pan,
6. valve pipe preloading device,
7. valve pipe riveting device,
8. valve pipe grinding device,
9. support shaft,
10. upper supporting disc
11. fixing bolt,
12. carrier seat,
13. carrier cover plate,
14. carrier positioning axis,
15. loading seat,
16. positioning slot,
17. screw shaft valve body,
18. carrier damping spring,
19. side valve pipe,
20. valve flange,
21. threaded pipe,
22. valve seat,
23. side positioning plate,
24. lower valve tube
25. carrier support,
26. loading rack,
27. push-in lever,
28. push-in guide plate,
29, feed cylinder
30. guide tube,
31. pushing cylinder,
32. dispensing base,
33. joining guide cylinder,
34. transverse feeding plate,
35. distribution displacement block, 36. guiding sliding sleeves,
37. push-in joining pipe,
38. guiding connecting plate,
39. dispensing seat,
40. push-in rack,
41. valve pipe push-in cylinder,
42. push-in axis,
43. push-in damper spring,
44. push-in guide bearings,
45. transverse push-in plate,
46. riveting rack,
47. riveting guide bearings,
48. transverse riveting plate,
49. outer riveting damper spring,
50. riveting spindle,
51. riveting cylinder,
52. inner riveting damper spring,
53. guide plug,
54. grinding rack.
55. push-in grinding cylinder,
56. grinding knife adjusting cylinder,
57. transverse grinding knife raising plate.
58. grinding knife raising plate,
59. stopper cylinder,
60. holding plate,
61. grinding spindle,
62. grinding,
63. feeding rack,
64. transverse unloading plate,
65. unloading translational sliding bar,
66. pneumatic sliding block,
67. reclaiming and discharging cylinder,
68. clamping cylinder,
69. clamping claws,
70. clamping opening.

The aforenoted and other features and advantages of the invention will be more fully understood from the following detailed description of certain embodiments of the invention, taken together with the accompanying drawings, which are meant to illustrate and not to limit the invention.

Figure 1:
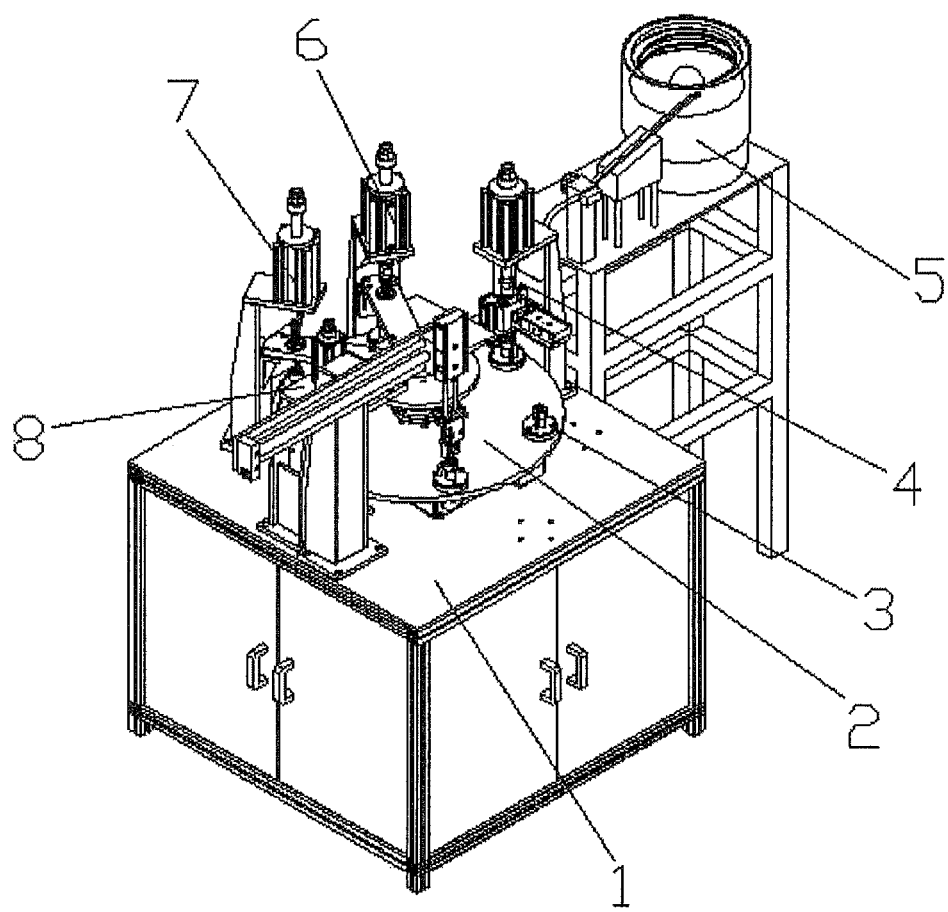
FIG. 1 shows a stereoscopic view of a structure of the invention.

As is shown in FIG. 1, the riveting and grinding assembly for nozzle of screw shaft valve may include a rack 1, a power control box, a turntable 2 and a turntable divider which engage with each other and are installed on the rack 1. On the edge of the said turntable 2, several carrier assemblies 3 which engage with the screw shaft valve body 17 are distributed in even span. On the center part of the said turntable 2, a support shaft 9 which is fixed with the rack 1 is vertically interposed and on top of the support shaft 9, an upper supporting disc 10 is installed. On the said rack 1, a valve pipe feeding device 4, a valve pipe preloading device 6, a valve pipe riveting device 7 and a valve pipe grinding device 8 which engage with the carrier assembly 3 are installed in the rotational direction of the turntable 2. The said turntable divider, valve pipe feeding device 4, valve pipe preloading device 6, valve pipe riveting device 7 and valve pipe grinding device 8 are all electrically connected to the power control box. As threaded pipe 21 is put into the carrier assembly 3 by valve pipe feeding device 4, carrier assembly 3 rotates in counterclockwise along the turntable 2 and rotates to the valve pipe preloading device 6 to press threaded pipe 21 into valve seat 22. Next rotates to the valve pipe riveting device 7 rivets threaded pipe 21 with valve flange 20 in order to finish assembling process. Then the carrier assembly 3 rotates to valve pipe grinding device 8 to grind nozzle of valve to finish grinding and riveting process of threaded pipe 21 with high positioning accuracy of assembly and marvelous hermetic sealing.

Figure 2:
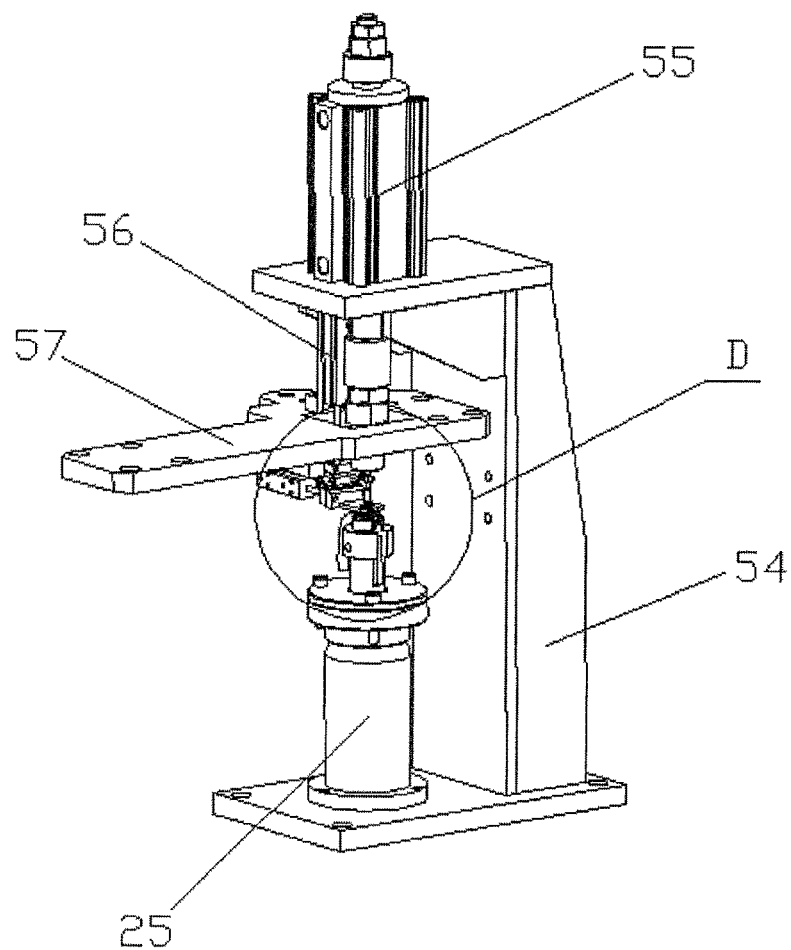
FIG. 2 shows a stereoscopic view of a structure of grinding device of nozzle.
Figure 3:
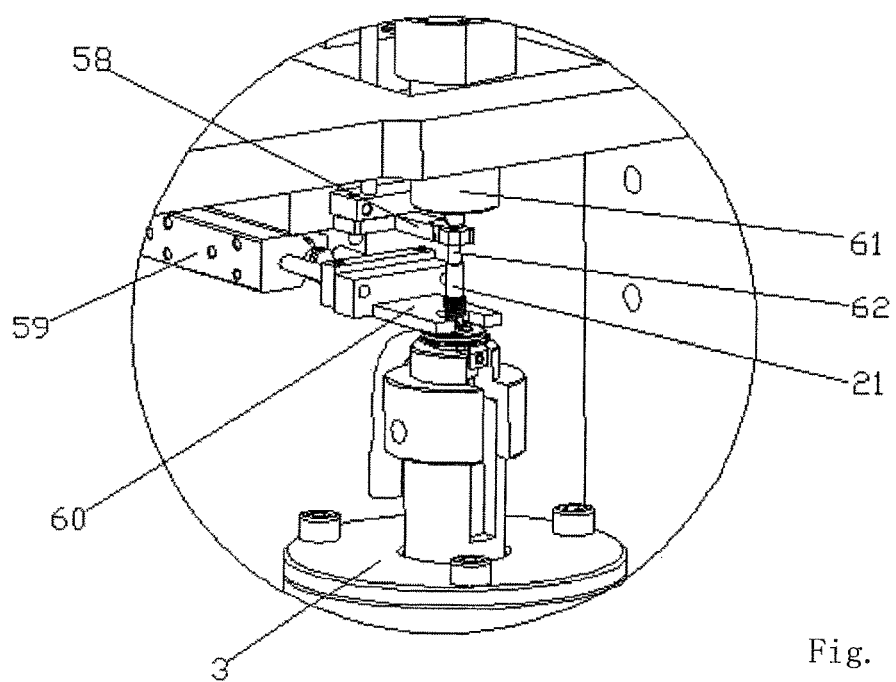
FIG. 3 shows a stereoscopic view of a partially enlarged view of part D.
Figure 4:
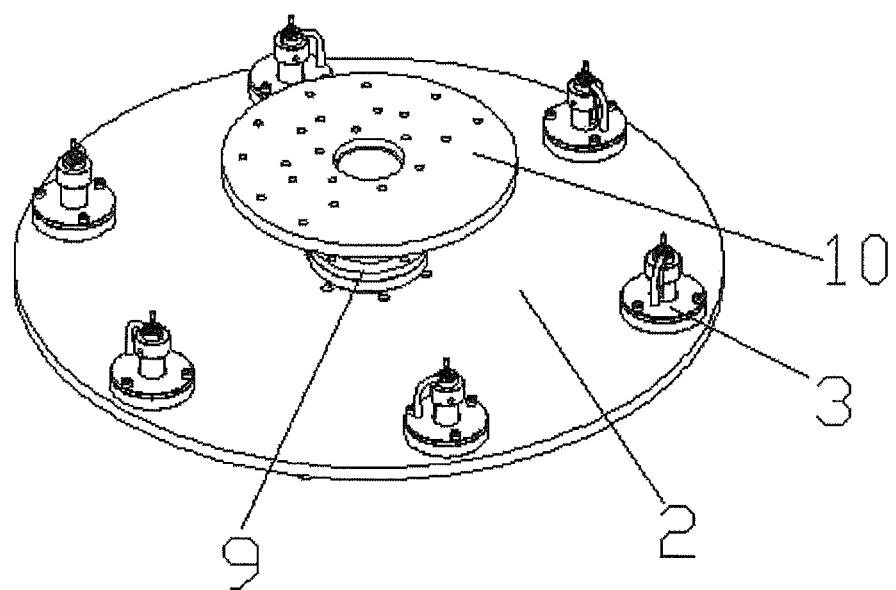
FIG. 4 shows a stereoscopic view of a turntable.

As is shown in FIGS. 2-3, the said valve pipe grinding device 8 may include a grinding rack 54 which is installed on the rack 1 and a carrier support 25 which is installed under the turntable 2 and engages with the carrier assembly 3. On horizontal direction of the grinding rack 54, a transverse grinding knife raising plate 57 which engages with the upper supporting disc 10 is installed. On the upper end of the said grinding rack 54, a push-in grinding cylinder 55 and a grinding knife adjusting cylinder 56 are installed with topside down in vertical direction. The output side of the said grinding knife adjusting cylinder 56 goes through the transverse grinding knife raising plate 57 and is connected to a grinding knife raising plate 58. On the said grinding knife raising plate 58, a grinding knife 62 which engages with the threaded pipe 21 by means of plug and fit is installed vertically. The output end of the said push-in grinding cylinder 55 is connected to a grinding spindle 61 which engages with the upper end of the grinding knife 62. Both the said push-in grinding cylinder 55 and grinding knife adjusting cylinder 56 are electrically connected to the power control box. With the push-in grinding cylinder 55 push the grinding spindle 61 downwardly, drive the grind 62 to insert threaded pipe 21 to squeeze and grind, it's convenient to get rid of burring.

As is shown in FIG. 3, a stopper cylinder 59 is installed on the bottom of the said transverse grinding knife raising plate 57. At the output end of the said stopper cylinder 59 a holding plate 60 which engages the screw shaft valve body 17 is connected. On one end of the said holding plate 60 is set an open slot designed for the threaded pipe 21. The said stopper cylinder 59 is electrically connected to the power control box, driving the holding plate 60 forward by stopper cylinder 59 to make it cover the screw shaft valve body, which may prevent the screw shaft valve body to be taken out of the carrier assembly 3 when the grinding 62 is extracted from threaded pipe 21.

Figure 5:
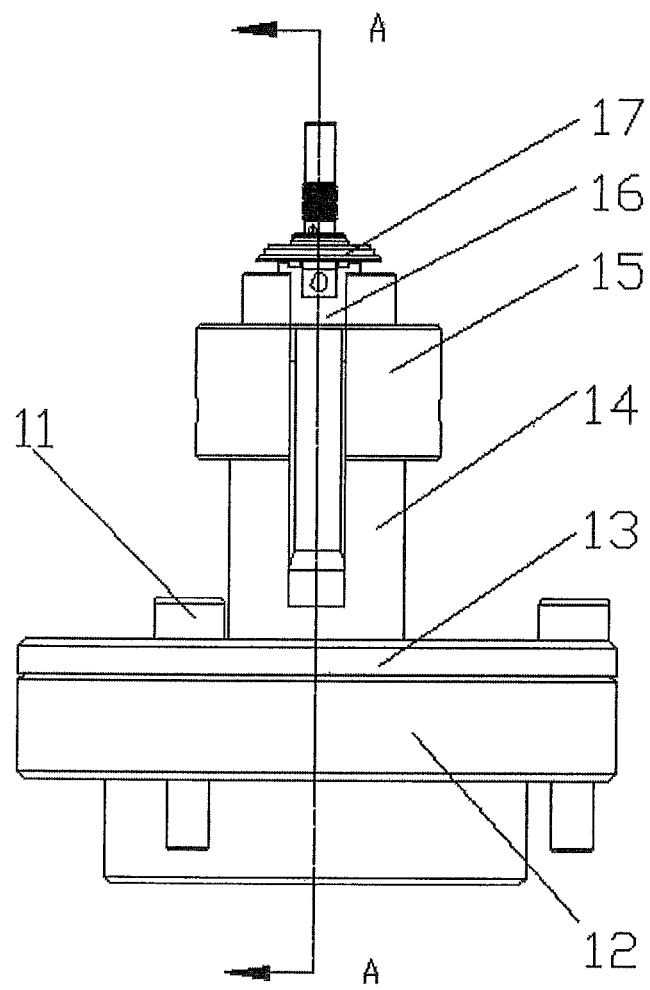
FIG. 5 shows a stereoscopic view of a carrier assembly.
Figure 6:
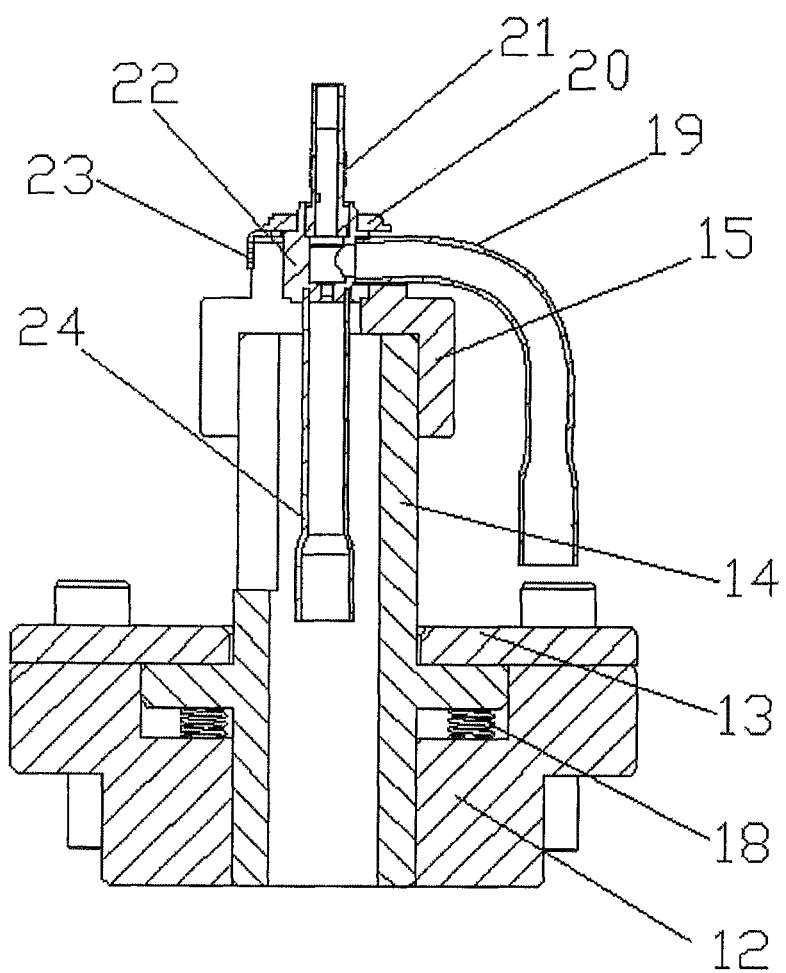
FIG. 6 is a sectional view taken along line A-A in FIG. 5.

As is shown in FIGS. 5-6, the said carrier assembly 3 may include a carrier seat 12 which is installed on the turntable 2 by fixing bolts 11. On center part of the said carrier seat 12 is set a countersunk hole where a hollow carrier positioning axis 14 is installed by plugging and fitting. On the said carrier positioning axis 14, a carrier cover plate 13 which engages with the carrier seat 12 is fixed. Between the said carrier positioning axe 14 and the said carrier seat 12, a carrier damping spring 18 is installed. On upper end of the said positioning axis 14, a loading seat 15 which engages with the valve seat 22 by plug and fit is sleeved. On both sides of the said loading seat 15, positioning slots 16 which respectively engage with the side positioning plate 23 and the side valve pipe 19 are installed. With carrier positioning axis 14 locating the valve seat 22, positioning slots 16 contains the side valve pipe 19 and the side positioning plate 23, the screw shaft valve body 17 may not turn during assembly process to ensure assembly precise.

Figure 7:
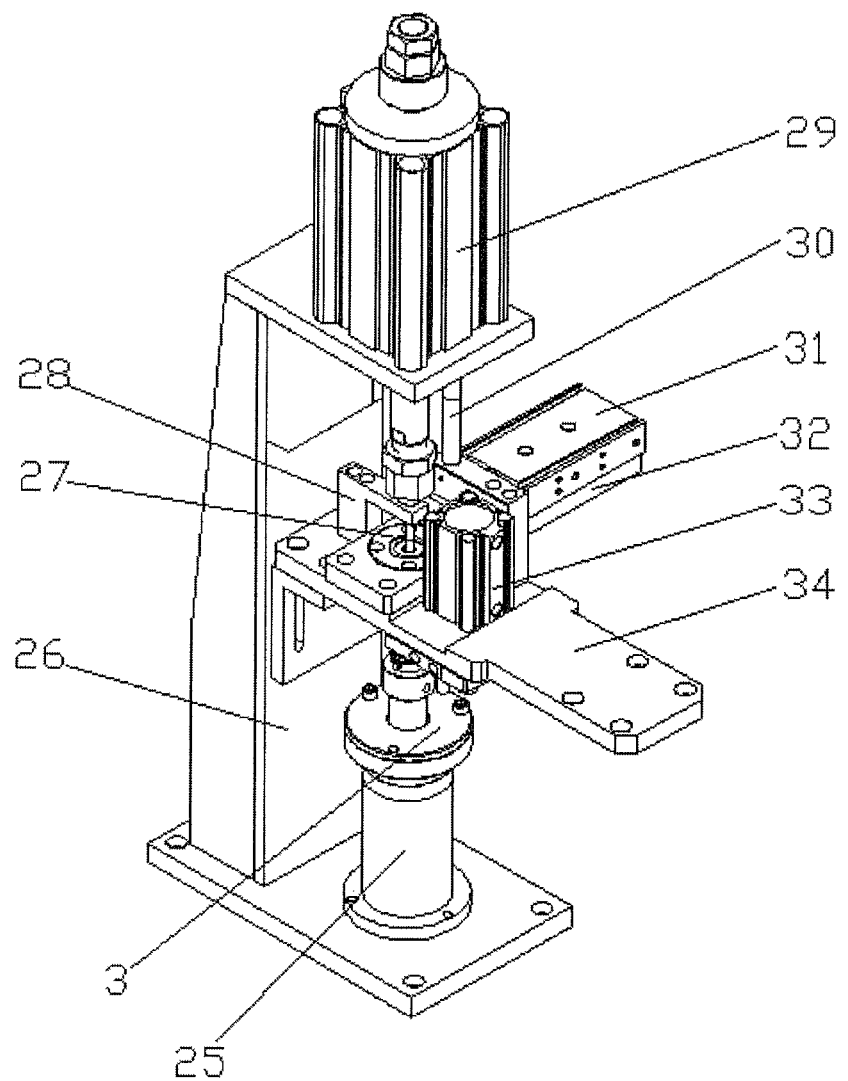
FIG. 7 shows a stereoscopic view of a valve pipe feeding device.

As is shown in FIG. 7, the said valve pipe feeding device 4 may include a loading rack 26 installed on the rack 1, a vibration feeding pan 5, and a carrier support 25 which engages with the carrier assembly 3 and is installed under the turntable 2. On the said feeding rack 26, a transverse feeding plate 34 which is connected to the upper supporting disc 10 is horizontally installed. On the said transverse feeding plate 34, a threaded pipe distribution device which engages with the vibration feeding pan 5 is installed. On upper end of the said feeding rack 26, a feeding cylinder 29 is installed vertically downward. On the output end of the said feeding cylinder 29 is connected a push-in lever 27 which shares the same axis with the carrier positioning axe 14. The lower end of the said push-in lever 27 goes through a push-in guide plate 28 which is installed on the transverse feeding plate 34, and the push-in lever 27 engages with threaded pipe distribution device by means of plug and fit. The said feeding cylinder 29 and the vibration feeding pan 5 are electrically connected to the power control box. A Screw shaft valve body 17 is transported to the distributing device of threaded pipe by vibration feeding pan 5. The push-in lever 27 is pushed downwardly by feeding cylinder 29 to make push-in lever 27 go through the push-in guide plate 28 and the distributing device of threaded pipe, and then put threaded pipe 21 which is in the distributing device of threaded pipe into the carrier assembly 3 to finish feeding process.

Figure 8:
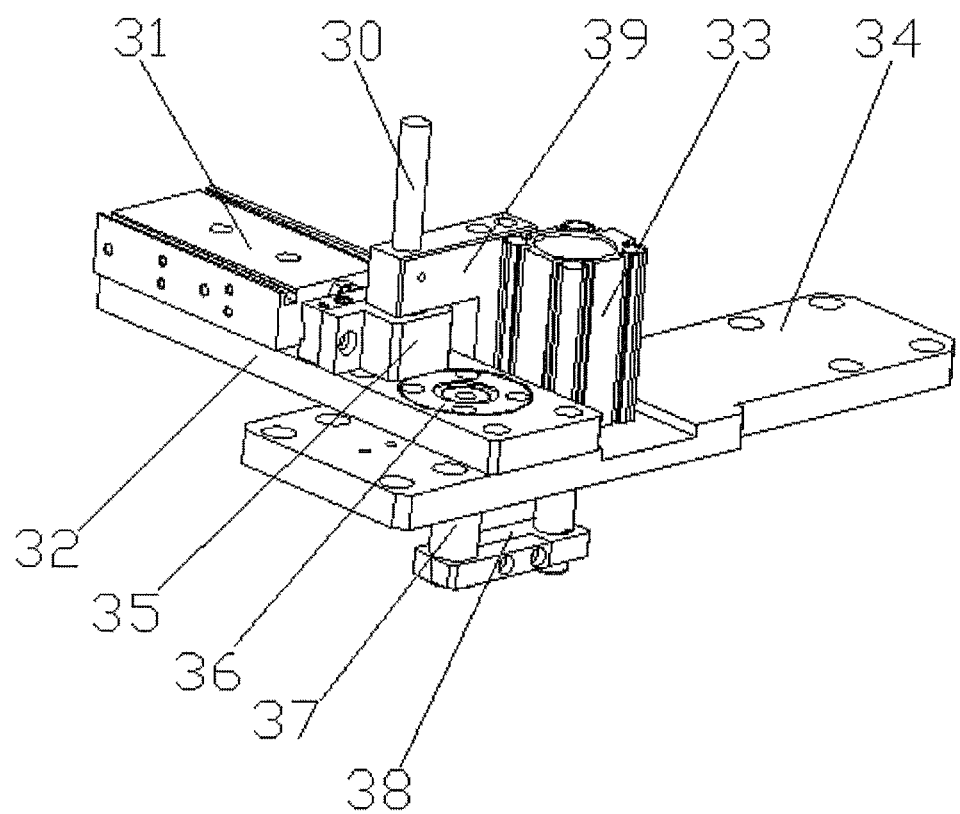
FIG. 8 shows a stereoscopic view of the structure of a distribution device of threaded pipe.

As is shown in FIG. 8, the said threaded pipe distribution device 34 may include a dispensing base 32 which is installed on the transverse feeding plate 34 on horizontal direction. On one end of the said dispensing base 32 is embedded a guiding sliding sleeve 36 which shares the same axis with the push-in lever 27. In the said guiding sliding sleeve 36 is slidably set a push-in joining pipe 37 engaging with the push-in lever 27 by means of plug and fit. On the lower end of the said push-in joining pipe 37, a guiding connecting plate 38 is sleeved. The said guiding connecting plate 38 is connected to the output of joining guide cylinder 33 which is installed on the transverse feeding plate 34 vertically. On the other end of the said distribution seat 32, a pushing cylinder 31 is installed on the horizontal direction. On the output end of the said pushing cylinder 31 is connected a distribution displacement block 35 which slidably engages with the distribution seat 32. On top of the said distribution displacement block 35, a dispensing seat 39 is installed and on the upper end of the said dispensing seat 39 is sleeved a guide tube 30 which engages with the vibration feeding pan 5 by means of plug and fit. The lower end of the said guide tube 30 may communicate with a dispensing hole in the distribution displacement block 35, and lower end of the same dispensing hole may communicate with the push-in joining pipe 37. The said pushing cylinder 31 and joining guide cylinder 33 are electrically connected to the power control box. With threaded pipe 21 dropping into the distribution displacement block 35 through the guide tube 30, the pushing cylinder 31 drives the distribution displacement block 35 along dispensing base 32, to make distributing hole vertically aligned with the push-in joining pipe 37. And then threaded pipe drops into the push-in joining, pipe 37 and make the distribution displacement block 35 reset to make it vertically aligned with the dispensing seat 39. Then push the push-in joining pipe 37 by joining guide cylinder 33 to make it connected to the carrier assembly 3, at the same time, the feed cylinder 29 pushes push-in lever 27 downward and drives push-in lever 27 into push-in joining pipe 37 to make threaded pipe drop into the carrier assembly 3 to finish feeding process with positioning accuracy.

Figure 9:
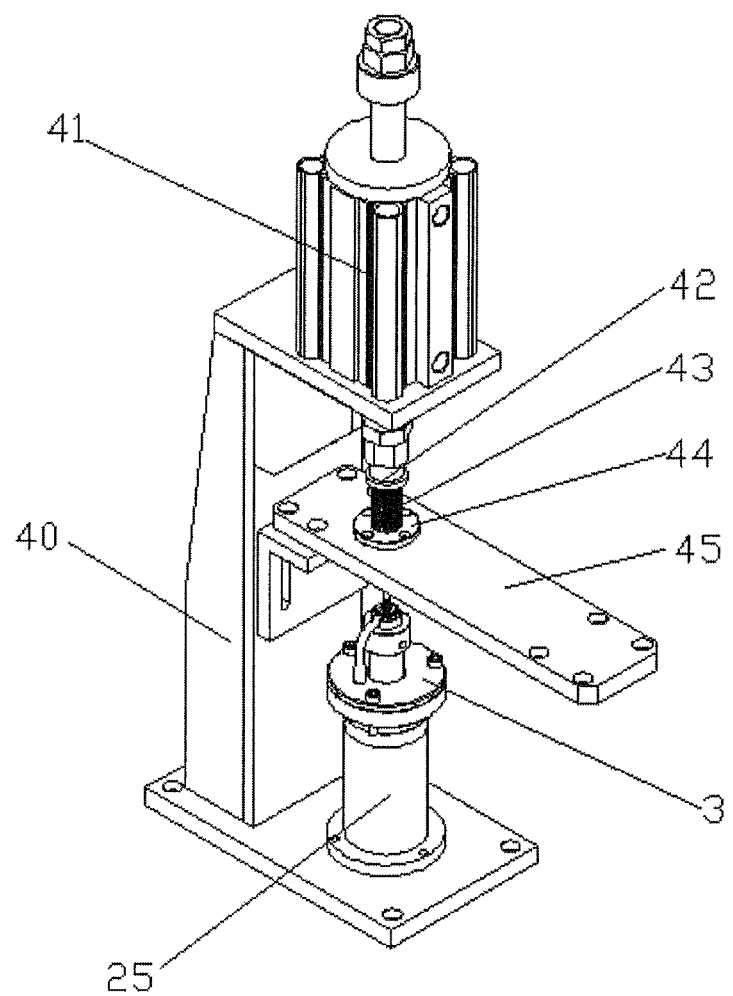
FIG. 9 shows a stereoscopic view of the structure of a push-in device.

As is shown in FIG. 9, said valve pipe preloading device 6 may include a push-in rack which is installed on the rack 1 and a carrier support 25 which is installed under the turntable 2 and engages with the carrier assembly 3. On the said push-in rack 40, a transverse push-in plate 45 which is connected to the upper supporting disc 10 is installed on horizontal direction. On the transverse push-in plate 45, directly above the carrier assembly a push-in guide bearing 44 is installed by plug and fit. On top of the push-in support 40, a valve pipe push-in cylinder 41 is vertically installed downwards. The output end of the said valve pipe push-in cylinder 41 is connected with a push-in shaft 42, which engages with the push-in guiding bearing 44 by plug and fit, furthermore, the push-in shaft and the thread valve pipe on the carrier assembly 3 shares the same axe. A push-in buffer spring 43 is sleeved to the push-in shaft 42. The said valve pipe push-in cylinder 41 is electrically connected to the power control box. Pressing cylinder of pipe-valve is installed above. With valve pipe push-in cylinder 41 driving push-in axis 42, push-in axis 42 is connected to threaded pipe 21 which is pressed into valve seat 22 to finish pre-pressing-in process.

Figure 10:
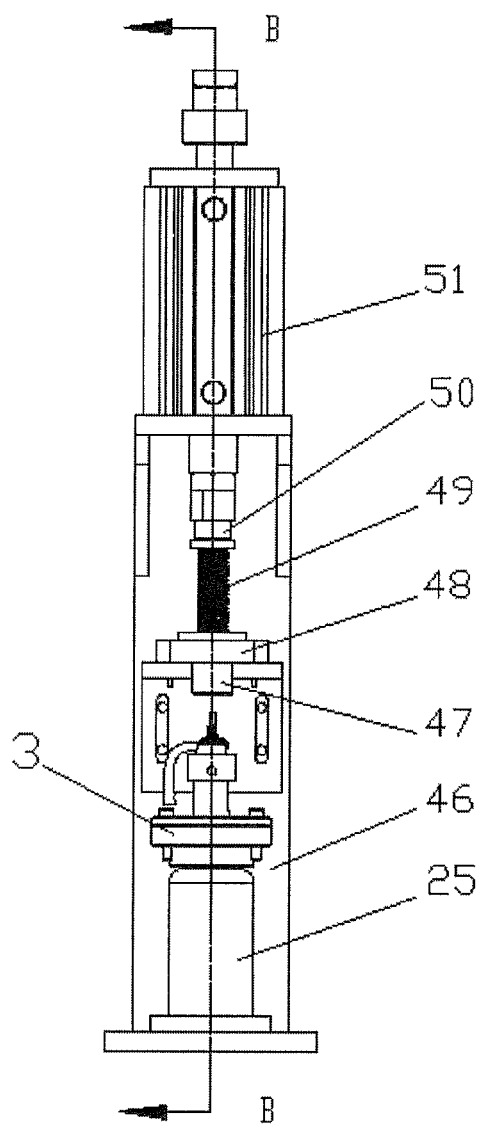
FIG. 10 shows a stereoscopic view of the structure of a riveting pipe-valve.
Figure 11:
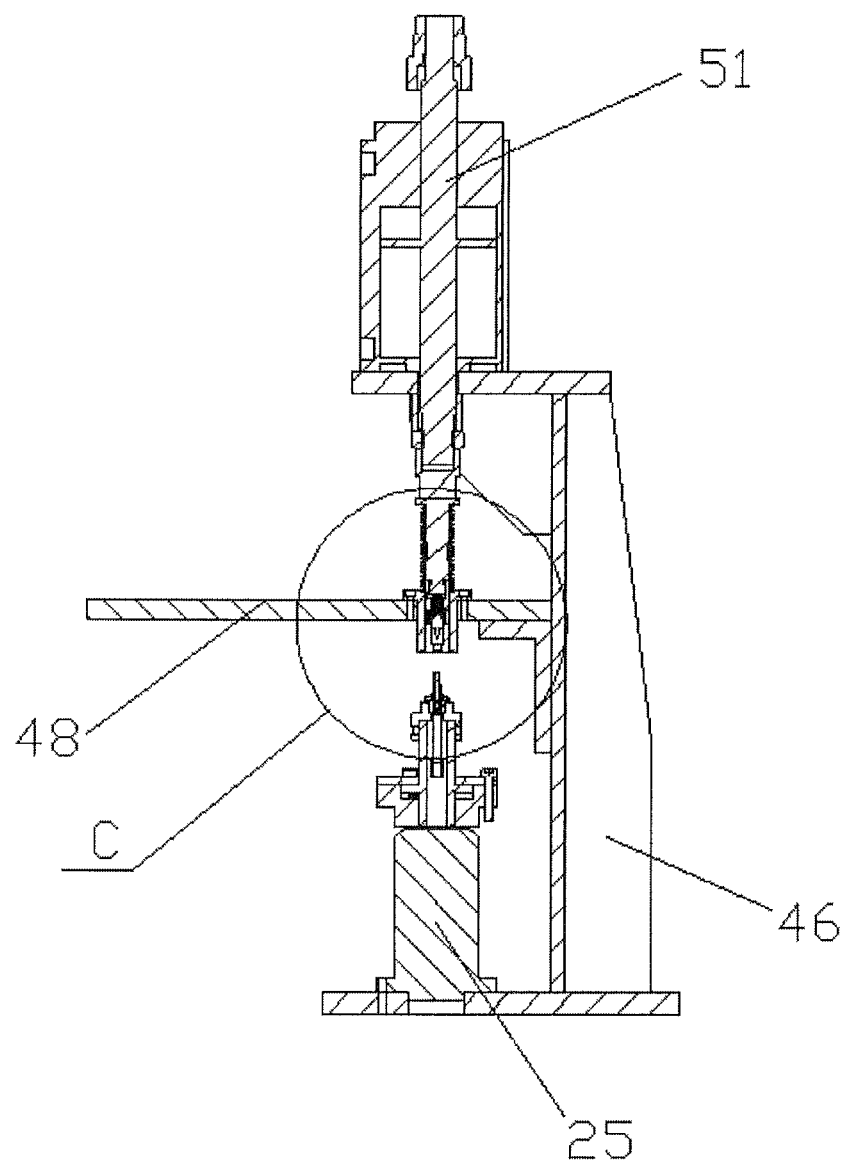
FIG. 11 is a sectional view taken along line A-A in FIG. 10.
Figure 12:
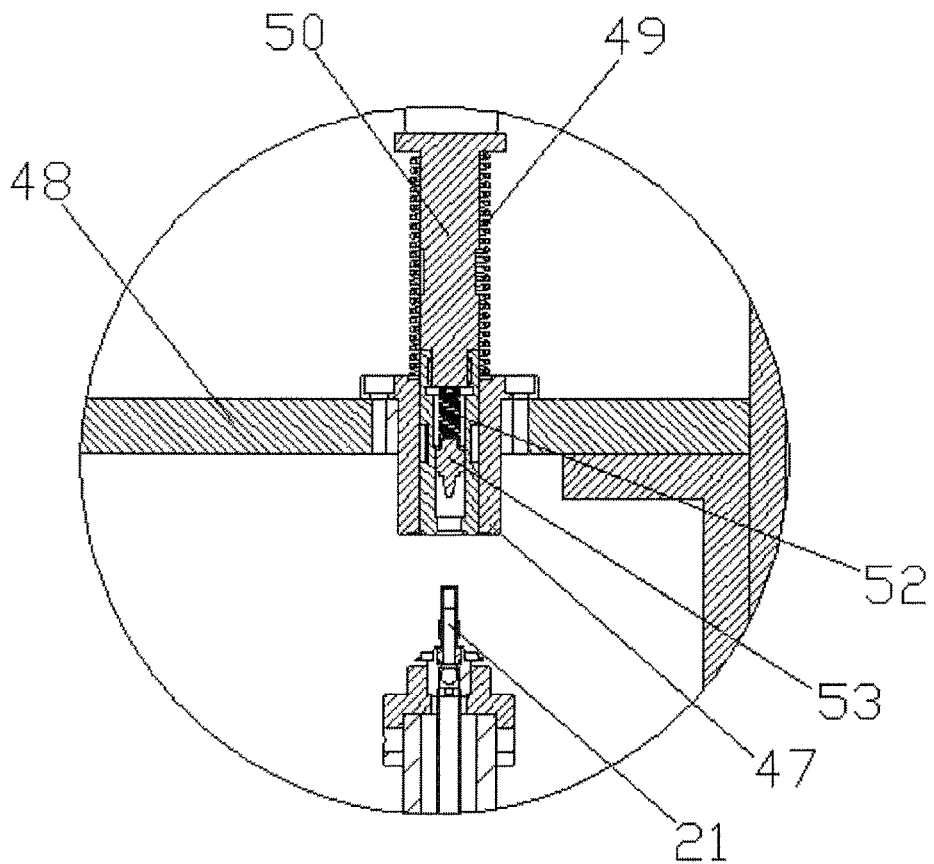
FIG. 12 shows a stereoscopic view of a partially enlarged view of part D in FIG. 11.
Figure 13:
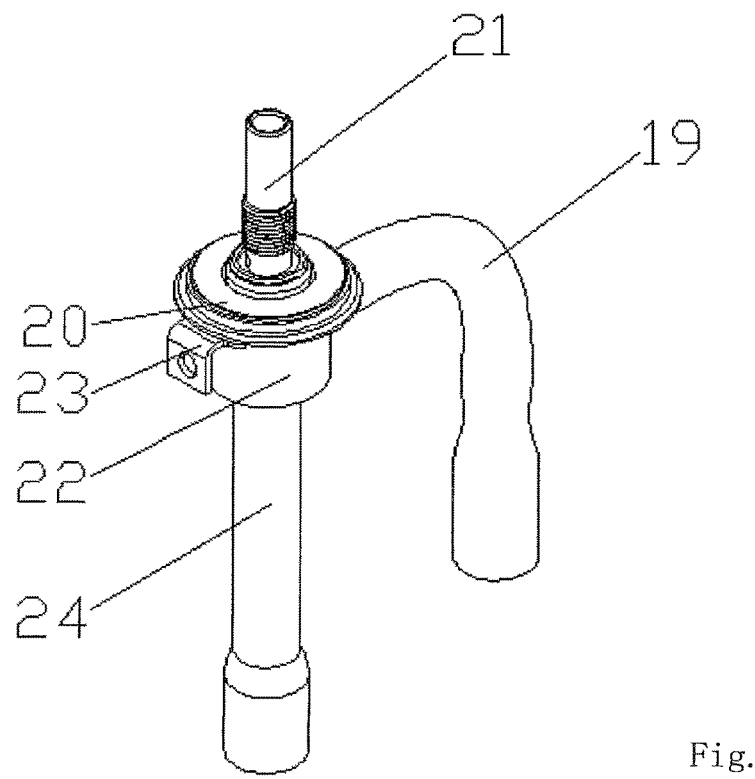
FIG. 13 shows a stereoscopic view of a screw shaft valve.

As is shown in FIGS. 10-12, the said valve pipe riveting device 7 may include a riveting rack 46 which is installed on the rack 1 and a carrier support 25 which is installed under the turntable 2 and engages with the carrier assembly 3. On the said riveting rack 46, a transverse riveting plate 48 which is connected to the upper supporting disc 10 is installed horizontally. Immediately above the carrier assembly 3 on the said transverse riveting plate 48 is set a riveting guide bearing 47 by means of plug and fit. On top of the said riveting rack 46, a riveting cylinder 51 whose output is connected to a riveting spindle 50 is installed vertically downward. On the lower end of the said riveting spindle 50 is set a hole which engages with the threaded pipe 21 by means of plug and fit and inside the hole, there is a guide plug 53 engaging with the threaded pipe 21 by sliding. An inner riveting damper spring 52 is installed at the connection between the upper end of the said guide plug 53 and the riveting spindle 50 while an outer riveting damper spring 49 engaging with the upper end of the riveting guiding bearing 47 is set on the riveting spindle 50. The said riveting cylinder 51 is electrically connected to the power control box. With driving the riveting spindle 50 downward by riveting axis 51, to make the guide plug 53 bears against the upper end of threaded pipe 21 and riveting cylinder 51 press down for some distances to make the lower end of the riveting spindle 50 connected to the valve flange 20 of carrier assembly 3 to finish riveting process.

Figure 14:
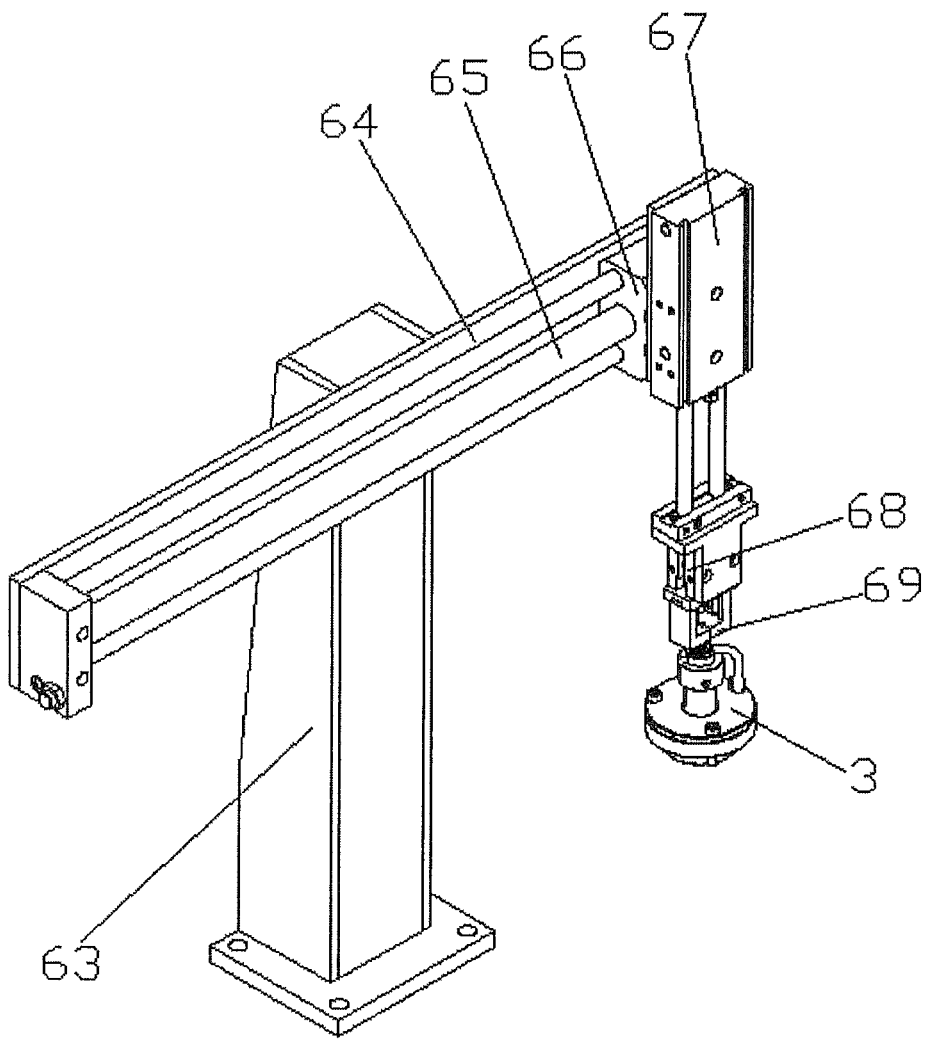
FIG. 14 shows a stereoscopic view of a feeding device.
Figure 15:
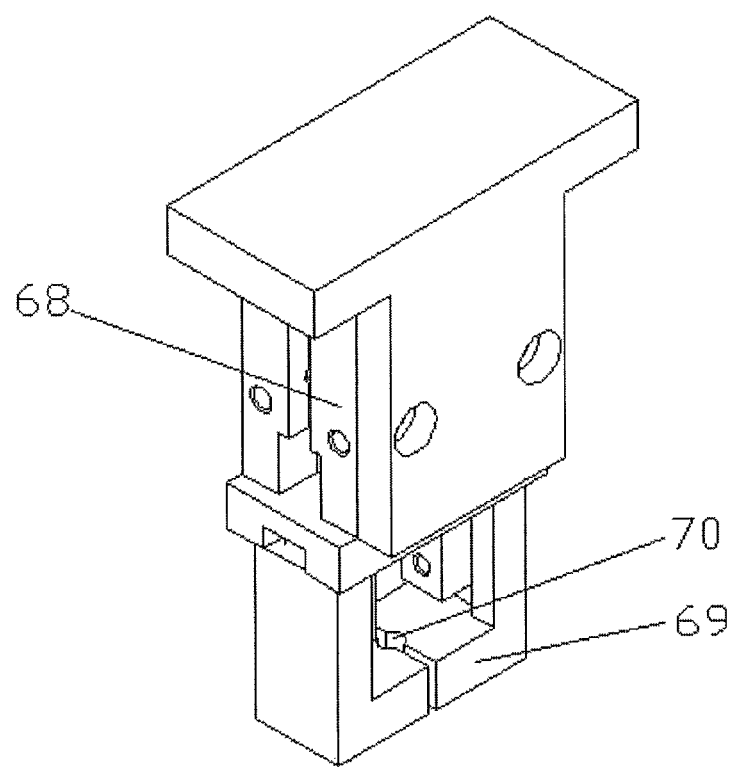
FIG. 15 shows a stereoscopic view of a clamping claw.

As is shown in FIGS. 14-15, on the front left of the said turntable 2, an unloading device is installed, which may include an unloading rack 63 which is installed on the rack 1. And on top of the said unloading rack 63, a transverse unloading plate 64 is installed vertically. On the said transverse unloading plate 64, an unloading translational sliding bar 65 is installed vertically. A pneumatic sliding block 66 is slidably fixed on the said unloading translational sliding bar 65. On the said pneumatic sliding block 66, a reclaiming and discharging cylinder 67 is vertically fixed. The output of the said reclaiming and discharging cylinder 67 is connected to a clamping cylinder 68 whose lower end is connected a clamping claw 69 which engages with the screw shaft valve body 17. A clamping opening 70 engaging with the threaded pipe 21 is installed on the said clamping claw 69. The screw shaft valve body 17 is clamped by clamping claws 69 which is driven by clamping cylinder 68, and clamping cylinder engages with threaded pipe 21 by clamping opening 70, and then pick up reclaiming and clamping cylinder 67, and the direction of unloading is along transverse unloading plate 64 by pneumatic sliding block 66.

In practical use, the screw shaft valve body is put into the carrier assembly 3 and the feeding process of threaded pipe 21 which is dropped into the distribution displacement block 35 by guide tube 30 may be proceed on the carrier assembly 3. Then the pushing cylinder 31 pushes the distribution displacement block 35 along dispensing base 32, to make the distributing hole vertically aligned with the push-in joining pipe 37. After the screw shaft valve body 17 is dropped into the push-in joining pipe 37, then the user may reset the distribution displacement block 35 and make it vertically aligned with the dispensing seat 39. Then feed cylinder 29 pushes the push-in lever 27 to make it insert into the push-in joining pipe 37 and make threaded pipe 21 drop into the carrier assembly 3 to finish feeding process with accurate location. The carrier assembly 3 rotates counterclockwise, turn to valve pipe preloading device 6 and drive threaded pipe into the pressing valve seat 22, then pushed the push-in axis 42 downward by valve pipe push-in cylinder 41 and makes it connected with threaded pipe 21 on the carrier assembly 3, to make it push into valve seat 22 to finish pre-pressing process. Then carrier assembly 3 proceeds rotation under the valve pipe riveting device 7, the riveting threaded pipe 21 and the valve flange 20, and push riveting spindle 50 downward by riveting cylinder 51, to make the lower end of riveting axis 50 connected to valve flange 20 which is on the carrier assembly 3 to finish the riveting process of wire rod pipe-valve with accurate location and good sealing. Then carrier assembly 3 continue to turn to the valve pipe grinding device 8 and grinding spindle 61 downward by push-in grinding cylinder 55, and then drive grinding 62 and insert it into the port of threaded pipe 21 to squeeze and grind with easy operation without burr. At the same time stopper cylinder 59 push holding plate 60 forward to make it cover the screw shaft valve body in case the screw shaft valve body is taken out of carrier assembly 3 when grinding 62 is extracted from threaded pipe 21

It should be noted that as the term "comprising" is used herein, "comprising" or any other variants thereof is intended to encompass a non-exclusive inclusion, such that a process comprising a series of elements is included, the method, the article or the device not only comprise those elements but also include other elements not explicitly listed, or further comprises the inherent elements of the process, the method, the article or the equipment.

The principles and the implementation mode of the invention are set forth in the specification, the description of the above examples is only used for helping understand the method of the invention and the core idea of the method, the above descriptions are only the said embodiments of the present invention, and it should be noted that, due to the limitation of character expression, an infinite specific structure exists objectively, for persons of ordinary skill in the art, without departing from the principle of the present invention, a plurality of improvements, modifications and changes can be made, and the technical features can also be combined in a proper manner; the conception and the technical scheme of the invention can be directly applied to other occasions without improving the conception and the technical scheme of the invention, should be regarded as the protection scope of the invention.

What is claimed is:

1. A riveting and grinding assembly for a nozzle of a screw shaft valve, comprising:
    a rack (1);
    a power control box;
    a turntable (2); and
    a turntable divider;
    wherein said power control box, said turntable (2), and said turntable divider engage each other and are installed upon said rack (1);
    wherein a plurality of carrier assemblies (3) are mounted upon and are equally distributed about an outer peripheral portion of said turntable (2) wherein each one of said plurality of carrier assemblies (3) comprises a screw shaft valve body (17);
    wherein a support shaft (9), which is fixed with said rack (1), is vertically disposed at a central portion of said turntable (2), and upon top of said support shaft (9), there is disposed an upper supporting disc (10);
    wherein a valve pipe feeding device (4), a valve pipe preloading device (6), a valve pipe riveting device (7), and a valve pipe grinding device (8) are mounted upon said rack so as to partially surround said turntable (2), wherein each one of said valve pipe feeding device (4), said valve pipe preloading device (6), said valve pipe riveting device (7), and said valve pipe grinding device (8) are adapted to engage said plurality of carrier assemblies (3); and
    wherein said turntable divider, said valve pipe feeding device (4), said valve pipe preloading device (6), said valve pipe riveting device (7), and said valve pipe grinding device (8) are all electrically connected to said power control box.

2. The riveting and grinding assembly for the nozzle of the screw shaft valve of claim 1, wherein:
    said valve pipe grinding device (8) comprises a vertically oriented upstanding grinding rack (54) which is installed upon said rack (1), and a carrier support (25) which is installed beneath said turntable (2) and which engages said plurality of carrier assemblies (3);
    wherein a horizontally oriented grinding knife raising plate (57), which engages said upper supporting disc (10), is installed upon said vertically oriented upstanding grind rack (54);
    wherein a horizontally oriented mounting plate is mounted upon an upper end portion of said grinding rack (54), a push-in grinding cylinder (55) is mounted upon an upper surface portion of said horizontally oriented mounting plate, and a grinding knife adjusting cylinder (56) is mounted upon an undersurface portion of said horizontally oriented mounting plate;
    wherein an output end of said grinding knife adjusting cylinder (56) extends through said grinding knife raising plate (57) and is connected to a grinding knife raising plate (58);
    wherein a vertically oriented grinding knife (62), which has a threaded pipe (21) mounted thereon, is is mounted upon said grinding knife raising plate (57);
    wherein an output end of said push-in grinding cylinder (55) is connected to a grinding spindle (61) which engages an upper end portion of said grinding knife (62); and
    wherein both said push-in grinding cylinder (55) and said grinding knife adjusting cylinder (56) are electrically connected to said power control box.

3. The riveting and grinding assembly for the nozzle of the screw shaft valve of claim 2, wherein:
    a stopper cylinder (59) is installed beneath an undersurface portion of said grinding knife raising plate (57);
    a holding plate (60) is mounted upon an output end of said stopper cylinder (59) for engaging one of said plurality of screw shaft valve bodies (17) of one of said plurality of carrier assemblies (3);
    an open slot is defined within one end of said holding plate (60) for accommodating said threaded pipe (21); and
    said stopper cylinder (59) is electrically connected to said power control box.

4. The riveting and grinding assembly for the nozzle of the screw shaft valve of with claim 1, wherein:

each one of said plurality of carrier assemblies (3) comprises a carrier seat (12) which is installed upon said turntable (2) by fixing bolts (11);

a through-bore is defined within a central portion of said carrier seat (12) through which a vertically oriented, upstanding carrier positioning axle (14) is installed;

an annular carrier cover plate (13), through which said vertically oriented, upstanding carrier positioning axle (14) also extends, is fixedly secured atop said carrier seat (12);

a carrier damping spring (18) is interposed between a radially outwardly extending annular portion of said vertically oriented, upstanding carrier positioning axle (14) and said carrier seat (12);

a loading seat (15), which is adapted to engage with a valve seat (22), is sleeved over an upper end portion of said vertically oriented, upstanding carrier positioning axle (14); and a pair of positioning slots (16) are defined upon opposite sides of said loading seat (15) so as to respectively a side positioning plate (23) and a side valve pipe (19).

5. The riveting and grinding assembly for the nozzle of the screw shaft valve of claim 4, wherein:

said valve pipe feeding device (4) comprises a loading rack (26) which is installed upon said rack (1), a vibration feeding pan (5), and a carrier support (25) which engages with each one of said plurality of carrier assemblies (3) and which is installed beneath said turntable (2);

a horizontally oriented feeding plate (34) is mounted upon said loading rack (26) and is connected to said upper supporting disc (10);

a threaded pipe distribution device, which engages with said vibration feeding pan (5), is installed upon said horizontally oriented feeding plate 34;

a vertically oriented, upstanding feeding cylinder (29) is installed upon an upper end portion of said feeding rack (26);

a push-in lever (27) is disposed upon an output end of said feeding cylinder (29) and is coaxially arranged with said vertically oriented, upstanding carrier positioning axle (14);

a lower end portion of said push-in lever (27) passes through a push-in guide plate 28 which is installed upon said horizontally oriented feeding plate (34), and said push-in lever (27) is engaged with said threaded pipe distribution device; and said feeding cylinder (29) and said vibration feeding pan 5 are electrically connected to said power control box.

6. The riveting and grinding assembly for the nozzle of the screw shaft valve of claim 5, wherein:

said threaded pipe distribution device comprises a dispensing base (32) which is disposed upon said horizontally oriented feeding plate (34);

a guiding sliding sleeve (36) is embedded within a first end of said dispensing base (32) and is coaxially disposed with respect to said push-in lever (27);

a vertically oriented push-in joining pipe (37) is slidably disposed within said guiding sliding sleeve (36) so as to engage said push-in lever (27);

a guiding connecting plate 38 is sleeved around a lower end portion of said vertically oriented push-in joining pipe (37), and said guiding connecting plate (38) is also connected to an output of a vertically oriented joining guide cylinder (33) which is disposed upon said horizontally oriented feeding plate (34);

a horizontally oriented pushing cylinder (31) is disposed upon a second opposite end of said distribution base 32;

a distribution displacement block (35) is connected to an output end of said horizontally oriented pushing cylinder (31) and is slidably engaged with distribution seat (32);

a dispensing seat (39) is mounted on top of said distribution displacement block (35), and a vertically oriented guide tube (30) is mounted upon an upper surface portion of said dispensing seat (39) such that an upper end portion of said vertically oriented guide tube (30) engages said vibration feeding pan (5) while a lower end portion of said guide tube (30) communicates with an upper end portion of a dispensing hole defined within said distribution displacement block (35) while a lower end portion of said dispensing hole communicates with said vertically oriented push-in joining pipe (37); and said horizontally oriented pushing cylinder (31) and said vertically oriented joining guide cylinder (33) are electrically connected to said power control box.

7. The riveting and grinding assembly for the nozzle of the screw shaft valve of claim 6, wherein:

said valve pipe preloading device (6) comprises a vertically oriented push-in rack (40) which is installed upon said rack (1), and a carrier support (25) which is installed beneath said turntable (2) and which engages with each one of said plurality of carrier assemblies (3);

a horizontally oriented push-in plate (45) is mounted upon said vertically oriented push-in rack (40) and is connected to said upper supporting disc (10);

a push-in guide bearing (44) is installed upon said horizontally oriented push-in plate (45) so as to be disposed above any one of said plurality of carrier assemblies (3);

a vertically oriented valve pipe push-in cylinder (41) is mounted upon an upper surface portion of said vertically oriented push-in rack (40) such that an output end of said vertically oriented valve pipe push-in cylinder (41) is operatively connected with a push-in shaft (42) which is adapted to be engaged with said push-in guiding bearing (44), said push-in shaft (42) and a threaded valve pipe on any one of said plurality of carrier assemblies (3) are coaxially disposed with respect to each other;

a push-in buffer spring (43) is sleeved around said push-in shaft (42); and said vertically oriented valve pipe push-in cylinder (41) is electrically connected to said power control box.

8. The riveting and grinding assembly for the nozzle of the screw shaft valve of claim 7, wherein:

said valve pipe riveting device (7) comprises a vertically oriented riveting rack (46) which is installed upon said rack (1), and a carrier support (25) which is installed beneath said turntable (2) and is adapted to engage any one of said plurality of carrier assemblies (3);

a horizontally oriented riveting plate (48) is mounted upon said vertically oriented riveting rack (46) and is connected to said upper supporting disc (10);

a riveting guide bearing (47) is mounted within said horizontally oriented riveting plate (48) so as to be disposed immediately above any one of said plurality of carrier assemblies (3);

a vertically oriented riveting cylinder (51) is mounted upon an upper surface portion of said riveting rack (46)

such that an output end of said vertically oriented riveting cylinder (51) is operatively connected to a riveting spindle (50);

a lower end portion of said riveting spindle (50) is provided with a hole which engages an upper end portion of a vertically upstanding threaded pipe (21), and inside of said hole, there is disposed a guide plug (53) for slidably engaging with said upper end portion of said vertically upstanding threaded pipe (21);

an inner riveting damper spring 52 is interposed between an upper end portion of said guide plug (53) and a lower end portion of said riveting spindle (50) while an outer riveting damper spring (49) is disposed around said riveting spindle (50) and is engaged with an upper end portion of said riveting guide bearing (47); and said vertically oriented riveting cylinder (51) is electrically connected to said power control box.

9. The riveting and grinding assembly for the nozzle of the screw shaft valve of claim 8, wherein:

an unloading device comprises a vertically oriented upstanding unloading rack (63) which is installed upon said rack (1);

a horizontally oriented unloading plate (64) is is mounted upon an upper portion of said vertically oriented upstanding unloading rack (63);

a horizontally oriented unloading translational sliding bar (65) is mounted upon said horizontally oriented unloading plate (64);

a pneumatic sliding block (66) is slidably mounted upon said horizontally oriented unloading translational sliding bar (65);

a vertically oriented reclaiming and discharging cylinder (67) is fixedly mounted upon said pneumatic sliding block (66);

an output of said reclaiming and discharging cylinder (67) is connected to a clamping cylinder (68) whose lower end is connected a clamping claw 69 which is adapted to engage any one of said screw shaft valve bodies (17) of said plurality of carrier assemblies (3); and a clamping opening (70) is defined within said clamping claw (69) for engaging with said threaded pipe (21).

\* \* \* \* \*